United States Patent
Russell et al.

(10) Patent No.: US 11,403,219 B2
(45) Date of Patent: Aug. 2, 2022

(54) METHOD AND SYSTEM FOR TARGETED PRE-CACHING OF DATA

(71) Applicant: JPMorgan Chase Bank, N.A., New York, NY (US)

(72) Inventors: David Alexander Russell, Helensburgh (GB); Ross Neilson, Glasgow (GB); Alasdair Popple, Edinburgh (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 14 days.

(21) Appl. No.: 17/144,501

(22) Filed: Jan. 8, 2021

(65) Prior Publication Data

US 2021/0209020 A1 Jul. 8, 2021

Related U.S. Application Data

(60) Provisional application No. 62/958,483, filed on Jan. 8, 2020.

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

2004/0093360 A1\* 5/2004 Hudson ................. G11B 20/12
2018/0054499 A1\* 2/2018 Greenberg .......... H04L 67/2847

\* cited by examiner

*Primary Examiner* — Jae U Yu
(74) *Attorney, Agent, or Firm* — Greenblum & Bernstein, P.L.C.

(57) ABSTRACT

A method for providing targeted pre-caching of data is disclosed. The method includes receiving a user login that includes an account identifier; automatically identifying a subset of the data previously accessed by the user using an activity log and the account identifier; generating a copy of the subset of the data; associating the copy with the subset of the data by linking the subset of the data with the copy; and storing the copy in a temporary file store. The method further includes receiving a request from the user for the subset of the data and displaying the copy on a graphical user interface.

20 Claims, 5 Drawing Sheets

METHOD AND SYSTEM FOR TARGETED PRE-CACHING OF DATA

CROSS-REFERENCE TO RELATED APPLICATIONS

This application claims the benefit of U.S. Provisional Patent Application Ser. No. 62/958,483, filed Jan. 8, 2020, which is hereby incorporated by reference in its entirety.

BACKGROUND

1. Field of the Disclosure

This technology generally relates to methods and systems for pre-caching data, and more particularly to methods and systems for identifying a user's previously accessed data and placing a copy of the data in a temporary file store in anticipation of the user's future need.

2. Background Information

In today's technological environment, many business entities acquire and process large amounts of data. The large volumes of data are generally placed in long-term storage and called upon when needed for various business purposes. Historically, managing large quantities of data, specifically recalling the data from long-term storage, have been technologically challenging. Various techniques have been implemented to combat these challenges such as, for example, caching data in quick-access temporary storage, have resulted in varying degrees of success with respect to speeding up user access to requested data.

One drawback of using conventional forms of data caching is that, in many instances, the caching process represents a reactive approach to data management. Current caching techniques are reactive because a specific volume of data is not cached into quick-access, temporary storage until the specific data has already been accessed by a user. As a result, this approach only speeds up data access for duplicate data access requests.

Therefore, there is a need for a proactive system that automatically anticipates data needs for various users and pre-caches a copy of the data into a temporary file store to enable rapid data retrieval for the users.

SUMMARY

The present disclosure, through one or more of its various aspects, embodiments, and/or specific features or sub-components, provides, inter alia, various systems, servers, devices, methods, media, programs, and platforms for identifying a user's previously accessed data and placing a copy of the data in a temporary file store in anticipation of the user's future need.

According to an aspect of the present disclosure, a method for providing targeted pre-caching of data is provided. The method is implemented by at least one processor. The method may include receiving a user login that may include at least one account identifier; automatically identifying at least a subset of the data previously accessed by a user using at least one activity log and the at least one account identifier; generating at least one copy of the at least a subset of the data; associating the at least one copy with the at least a subset of the data by linking the at least a subset of the data with the at least one copy; and storing the at least one copy in at least one temporary file store.

In accordance with an exemplary embodiment, the method may further include receiving, via the graphical user interface, a request from the user for the at least a subset of the data; and displaying, via a display, the at least one copy on the graphical user interface.

In accordance with an exemplary embodiment, the method may further include receiving, via a graphical user interface, a new user login; identifying, in the network file store, at least a new subset of the data previously accessed by the user; identifying, in the at least one temporary file store, the at least one copy corresponding to the user; and comparing the at least a new subset of the data with the corresponding at least one copy.

In accordance with an exemplary embodiment, the method may further include determining whether the at least a new subset of the data includes new information that is not present in the at least one copy, updating, based on a result of the determining, the at least one copy with the new information; and storing, in the at least one temporary file store, the updated at least one copy.

In accordance with an exemplary embodiment, the at least one activity log may include at least one of a record of the user's previous data access and a record of previous data access for a plurality of second users with at least one characteristic in common with the user.

In accordance with an exemplary embodiment, the at least one activity log may further include data access activity corresponding to a predetermined period of time.

In accordance with an exemplary embodiment, the graphical user interface may include at least one user selectable element for manual selection of at least a second subset of the data to store in the temporary file store.

In accordance with an exemplary embodiment, the at least a second subset of the data may be automatically associated with a plurality of other users with at least one characteristic in common with the user.

In accordance with an exemplary embodiment, the at least one copy in the at least one temporary file store may be automatically updated based on a predetermined time interval.

In accordance with an exemplary embodiment, the at least one temporary file store may include at least one hardware component and at least one software component that computes data relations in advance of a request for data to enable faster access to the data.

According to an aspect of the present disclosure, a computing device configured to implement an execution of a method for providing targeted pre-caching of data is disclosed. The computing device comprising a processor; a memory; and a communication interface coupled to each of the processor and the memory, wherein the processor may be configured to receive, via a graphical user interface, a user login that includes at least one account identifier; automatically identify, in a network file store, at least a subset of the data previously accessed by a user using at least one activity log and the at least one account identifier; generate at least one copy of the at least a subset of the data; associate the at least one copy with the at least a subset of the data by linking the at least a subset of the data with the at least one copy; and store the at least one copy in at least one temporary file store.

In accordance with an exemplary embodiment, the processor may be further configured to receive, via the graphical user interface, a request from the user for the at least a subset of the data, and display, via a display, the at least one copy on the graphical user interface.

In accordance with an exemplary embodiment, the processor may be further configured to receive, via a graphical user interface, a new user login, identify, in the network file store, at least a new subset of the data previously accessed by the user; identify, in the at least one temporary file store, the at least one copy corresponding to the user; and compare the at least a new subset of the data with the corresponding at least one copy.

In accordance with an exemplary embodiment, the processor may be further configured to determine whether the at least a new subset of the data includes new information that is not present in the at least one copy; update, based on a result of the determining, the at least one copy with the new information; and store, in the at least one temporary file store, the updated at least one copy.

In accordance with an exemplary embodiment, the at least one activity log may include at least one from among a record of previous data access by the user and a record of previous data access for a plurality of second users with at least one characteristic in common with the user.

In accordance with an exemplary embodiment, the at least one activity log may further include data access activity corresponding to a predetermined period of time.

In accordance with an exemplary embodiment, the graphical user interface may include at least one user selectable element for manual selection of at least a second subset of the data to store in the temporary file store.

In accordance with an exemplary embodiment, the processor may be further configured to automatically associate the at least a second subset of the data with a plurality of other users with at least one characteristic in common with the user.

In accordance with an exemplary embodiment, the processor may be further configured to automatically update the at least one copy in the at least one temporary file store based on a predetermined time interval.

In accordance with an exemplary embodiment, the at least one temporary file store may include at least one hardware component and at least one software component that computes data relations in advance of a request for data to enable faster access to the data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
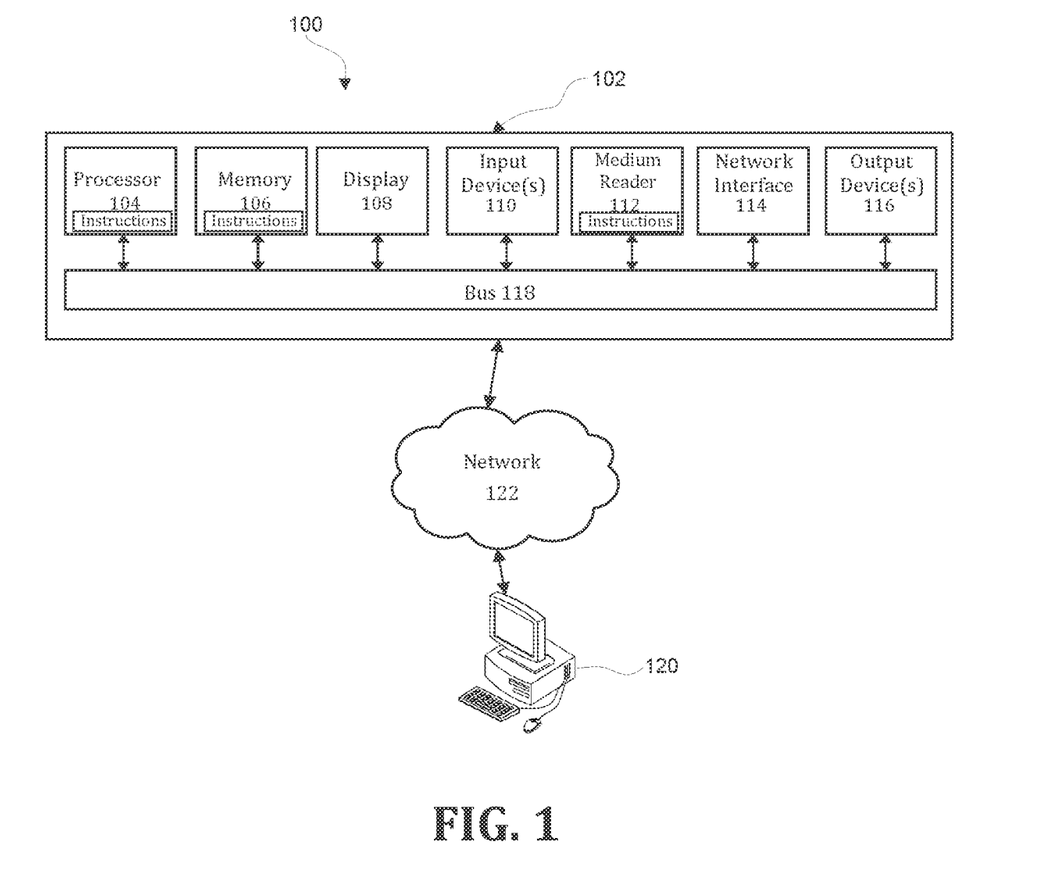
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for identifying a user's previously accessed data and placing a copy of the data in a temporary file store in anticipation of the user's future need.

Figure 2:
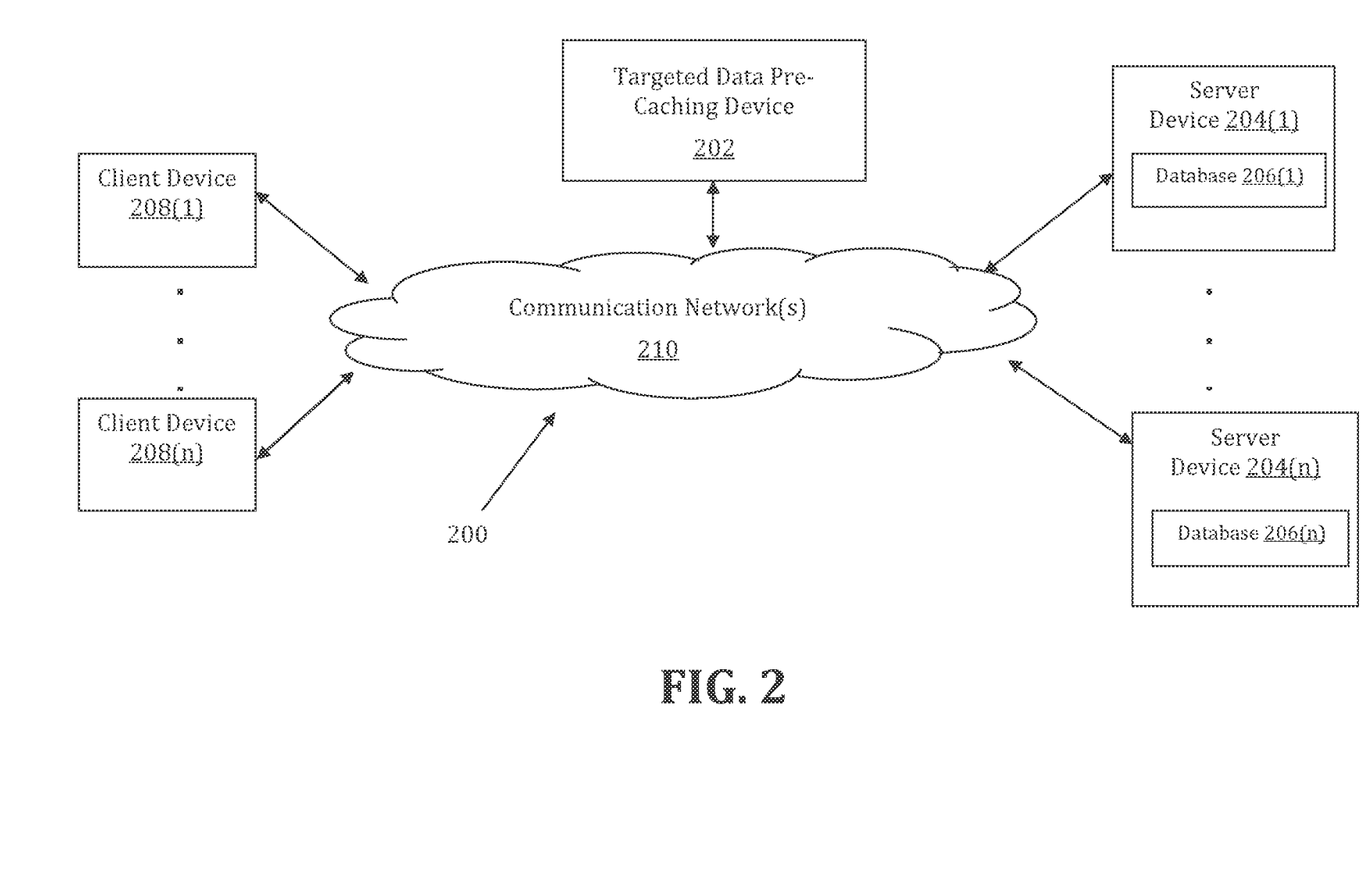
FIG. 2 illustrates an exemplary diagram of a network environment.

Referring to FIG. 2, a schematic of an exemplary network environment 200 for implementing a method for identifying a user's previously accessed data and placing a copy of the data in a temporary file store in anticipation of the user's future need is illustrated. In an exemplary embodiment, the method is executable on any networked computer platform, such as, for example, a personal computer (PC).

The method for identifying a user's previously accessed data and placing a copy of the data in a temporary file store in anticipation of the user's future need may be implemented by a Targeted Data Pre-Caching (TDPC) device 202. The TDPC device 202 may be the same or similar to the computer system 102 as described with respect to FIG. 1. The TDPC device 202 may store one or more applications that can include executable instructions that, when executed by the TDPC device 202, cause the TDPC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TDPC device 202 itself, may be located in virtual server(s) running in a cloud-based computing environment rather than being tied to one or more specific physical network computing devices. Also, the application(s) may be running in one or more virtual machines (VMs) executing on the TDPC device 202. Additionally, in one or more embodiments of this technology, virtual machine(s) running on the TDPC device 202 may be managed or supervised by a hypervisor.

In the network environment 200 of FIG. 2, the TDPC device 202 is coupled to a plurality of server devices 204(1)-204(n) that hosts a plurality of databases 206(1)-206(n), and also to a plurality of client devices 208(1)-208(n) via communication network(s) 210. A communication interface of the TDPC device 202, such as the network interface 114 of the computer system 102 of FIG. 1, operatively couples and communicates between the TDPC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TDPC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TDPC devices that efficiently implement a method for identifying a user's previously accessed data and placing a copy of the data in a temporary file store in anticipation of the user's future need.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TDPC device 202 may be a standalone device or integrated with one or more other devices or apparatuses, such as one or more of the server devices 204(1)-204(n), for example. In one particular example, the TDPC device 202 may include or be hosted by one of the server devices 204(1)-204(n), and other arrangements are also possible. Moreover, one or more of the devices of the TDPC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TDPC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user logins, account identifiers, activity logs, and data copies.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the TDPC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TDPC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TDPC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TDPC device 202, the server devices 204(1)-204(n), or the client devices 208(1)-208(n), for example, may be configured to operate as virtual instances on the same physical machine. In other words, one or more of the TDPC device 202, the server devices 204 (1)-204(n), or the client devices 208(1)-208(n) may operate on the same physical device rather than as separate devices communicating through communication network(s) 210. Additionally, there may be more or fewer TDPC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
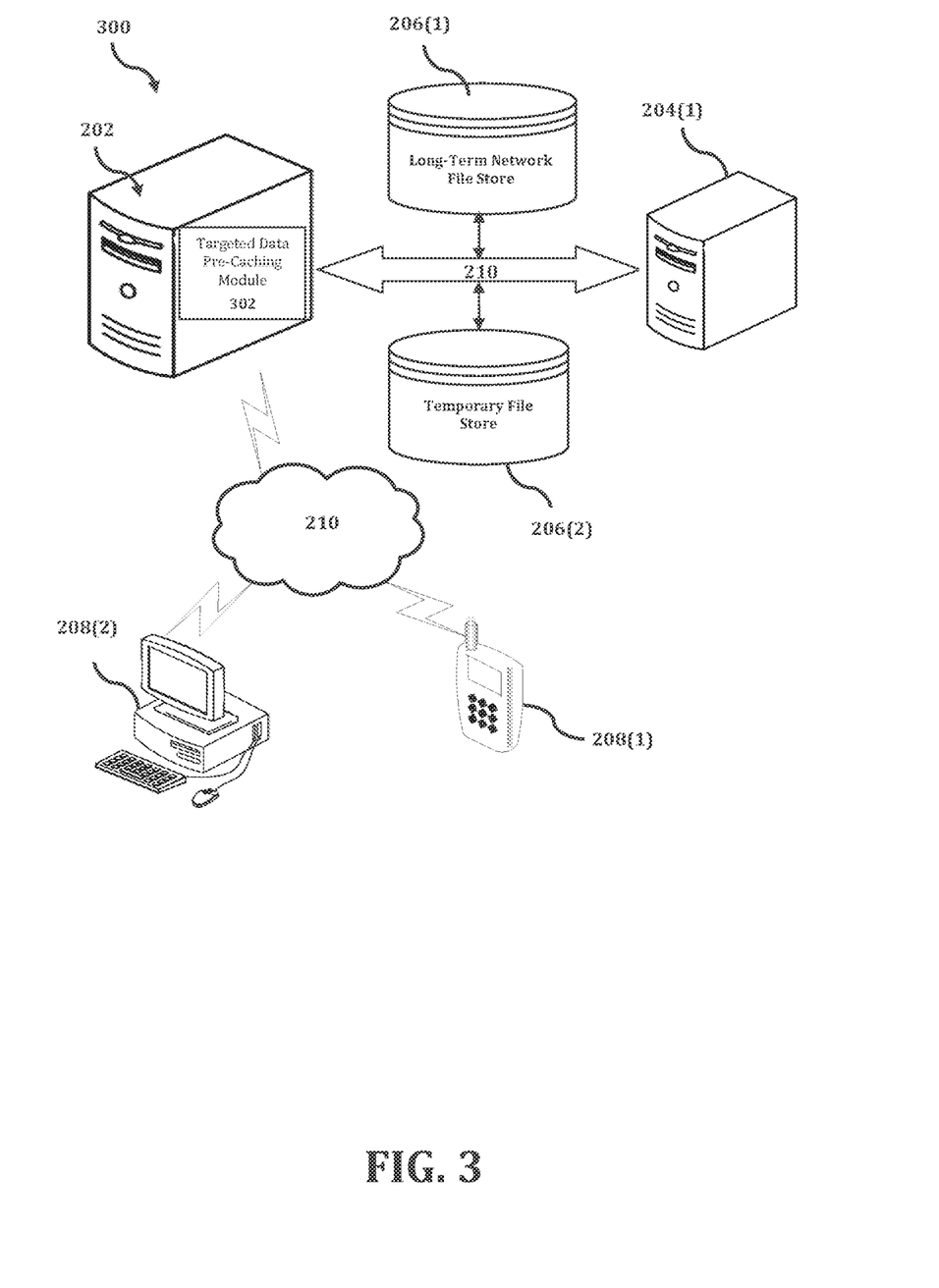
FIG. 3 shows an exemplary system for implementing a method for identifying a user's previously accessed data and placing a copy of the data in a temporary file store in anticipation of the user's future need.

The TDPC device 202 is described and shown in FIG. 3 as including a targeted data pre-caching module 302, although it may include other rules, policies, modules, databases, or applications, for example. As will be described below, the targeted data pre-caching module 302 is configured to implement a method for identifying a user's previously accessed data and placing a copy of the data in a temporary file store in anticipation of the user's future need.

An exemplary process 300 for implementing a mechanism for identifying a user's previously accessed data and placing a copy of the data in a temporary file store in anticipation of the user's future need by utilizing the network environment of FIG. 2 is shown as being executed in FIG. 3. Specifically, a first client device 208(1) and a second client device 208(2) are illustrated as being in communication with TDPC device 202. In this regard, the first client device 208(1) and the second client device 208(2) may be "clients" of the TDPC device 202 and are described herein as such. Nevertheless, it is to be known and understood that the first client device 208(1) and/or the second client device 208(2) need not necessarily be "clients" of the TDPC device 202, or any entity described in association therewith herein. Any additional or alternative relationship may exist between either or both of the first client device 208(1) and the second client device 208(2) and the TDPC device 202, or no relationship may exist.

Further, TDPC device 202 is illustrated as being able to access a long-term network file store 206(1) and a temporary file store 206(2). The targeted data pre-caching module 302 may be configured to access these databases for implementing a method for identifying a user's previously accessed data and placing a copy of the data in a temporary file store in anticipation of the user's future need.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s)210, which may comprise plural networks as described above. For example, in an exemplary embodiment, either or both of the first client device 208(1) and the second client device 208(2) may communicate with the TDPC device 202 via broadband or cellular communication. Of course, these embodiments are merely exemplary and are not limiting or exhaustive.

Upon being started, the targeted data pre-caching module 302 executes a process for identifying a user's previously accessed data and placing a copy of the data in a temporary file store in anticipation of the user's future need. An exemplary process for identifying a user's previously accessed data and placing a copy of the data in a temporary file store in anticipation of the user's future need is generally indicated at flowchart 400 in FIG. 4.

Figure 4:
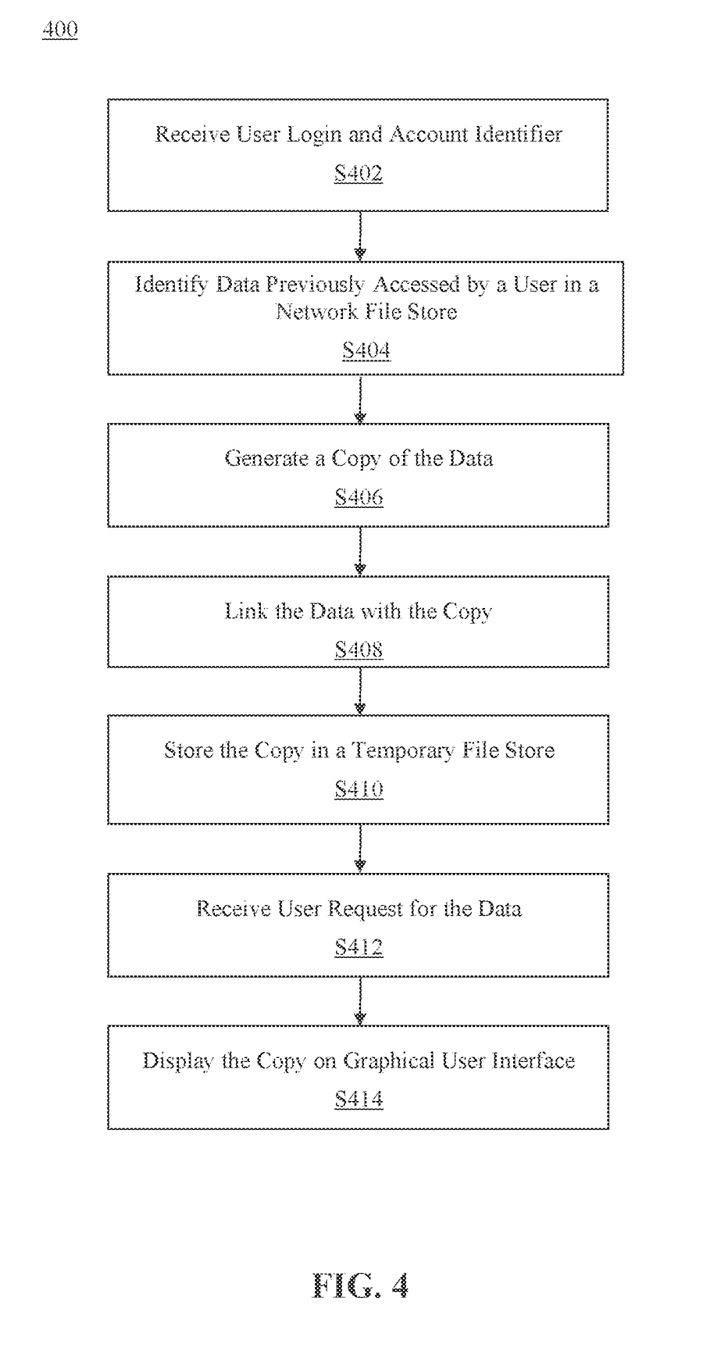
FIG. 4 is a flowchart of an exemplary process for implementing a method for identifying a user's previously accessed data and placing a copy of the data in a temporary file store in anticipation of the user's future need.

In the process 400 of FIG. 4, at step S402, a user login that may include an account identifier is received. The user login may be received via an interface of a client device such as, for example, a graphical user interface. In an exemplary embodiment, users may log in and gain access to a computer system by identifying and authenticating themselves. User credentials for login may include, for example, a specific username and corresponding password for each user. In another exemplary embodiment, user credentials for login may include biometric parameters such as, for example, a user's fingerprint that is received from an input device connected to the client device.

In another exemplary embodiment, an account identifier may correlate with the specific username. The account identifier may be received via a user input or retrieved from a database using the user's login credentials. In another exemplary embodiment, the account identifier may comprise any combination of numbers, texts, and symbols.

At step S404, a subset of the data previously accessed by a user is automatically identified using an activity log and the account identifier. The subset of the data may correspond to a larger group of the data such as, for example, a subset of specific client data from a larger group of all client data. In an exemplary embodiment, data previously accessed by the user may include specific data accessed by the user such as, for example, a specific client file as well as larger batches of data accessed by the user such as, for example, all client files corresponding to a specific broker.

In another exemplary embodiment, an activity log may include data access activity from the user for a predetermined period of time such as, for example, all the data the user accessed within the past thirty days. In another exemplary embodiment, the activity log may include information relating to data access activity for a plurality of users with a predetermined characteristic such as, for example, a workgroup characteristic that is in common with the user. The subset of the data may be automatically identified using the activity log through various data analytics methods such as, for example, comparing the activity log to available data in a long-term network file store to determine specific data that are frequently accessed by the user.

At step S406, a copy of the identified subset of the data is generated. In an exemplary embodiment, the copy may correspond to an exact duplication of the data determined as having been frequently accessed by the user. In another exemplary embodiment, the copy of the data may correspond to a duplication of the content of the data contained in a different computer file format. As will be appreciated by a person of ordinary skill in the art, the data in the present disclosure may be encoded for storage in a standard computer readable file format such as, for example, a Structured Query Language (SQL) format, a proprietary computer readable format, as well as data container formats such as, for example, Roshal Archive (RAR) formats according to encoding requirements. Then, at step S408, the copy is associated with the subset of the data by linking the copy with the subset of the data. In another exemplary embodiment, information relating to the association may be stored separately from the copy such as, for example, in a table or integrated into the copy such as, for example, as metadata.

In another exemplary embodiment, a new version of the copy may be generated according to a predetermined period of time such as, for example, once a day. For data types that changes more often such as, for example, data reflecting price fluctuations of a portfolio throughout the day, the copy may be generated at more frequent intervals such as, for example, four times a day. In another exemplary embodiment, the new version of the copy may be generated in real-time corresponding to the frequency of user login. In another exemplary embodiment, a user selectable element on the graphical user interface may allow the user to predetermine the period of time.

At step S410, the copy, together with corresponding linking information, is stored in a temporary file store. In an exemplary embodiment, the temporary file store may correspond to a hardware component on a localized computing system that stores data so that future requests for the data can be served faster. The hardware component used for temporary storage may include, for example, a CPU cache and a GPU cache, which are small memories allocated to temporary storage of data closer to processors resulting in fewer bottlenecks in data retrieval.

In another exemplary embodiment, the temporary file store may correspond to a software component on a networked database that may compute data relations in advance so that future requests for the data may be served faster. The software component used for temporary storage may include, for example, a disk cache, a web cache, and a memorization cache, which are software-based optimizations for previously used data that may result in quicker data retrieval. In another exemplary embodiment, the software component may include a relational database model such as, for example, Microsoft SQL Server, Oracle Database, MySQL, and other proprietary methods of implementing the relational database model for data storage.

At step S412, a request for the subset of the data is received from the user. The user may request the subset of the data from the graphical user interface on the client device. In an exemplary embodiment, the user may request the subset of the data from the same client device that received the user login as well as a separate client device. For example, the user may log in through one terminal at work to initiate the temporary storage of the subset of the data and request the subset of the data at a different terminal at home. In another exemplary embodiment, the user requesting the subset of the data may correspond to a different user who shares a similar characteristic with the login user. For example, a group supervisor may log in and initiate the temporary storage of the subset of the data, which creates a copy of the subset of the data accessible by everyone in the supervisor's group.

Then, at step S414, the copy corresponding to the user request is displayed on the graphical user interface. In another exemplary embodiment, displaying the copy from the temporary file store may be completed without additional computations otherwise required to display the data from long-term network file storage. A reduction in required steps may result in time savings for the user.

Figure 5:
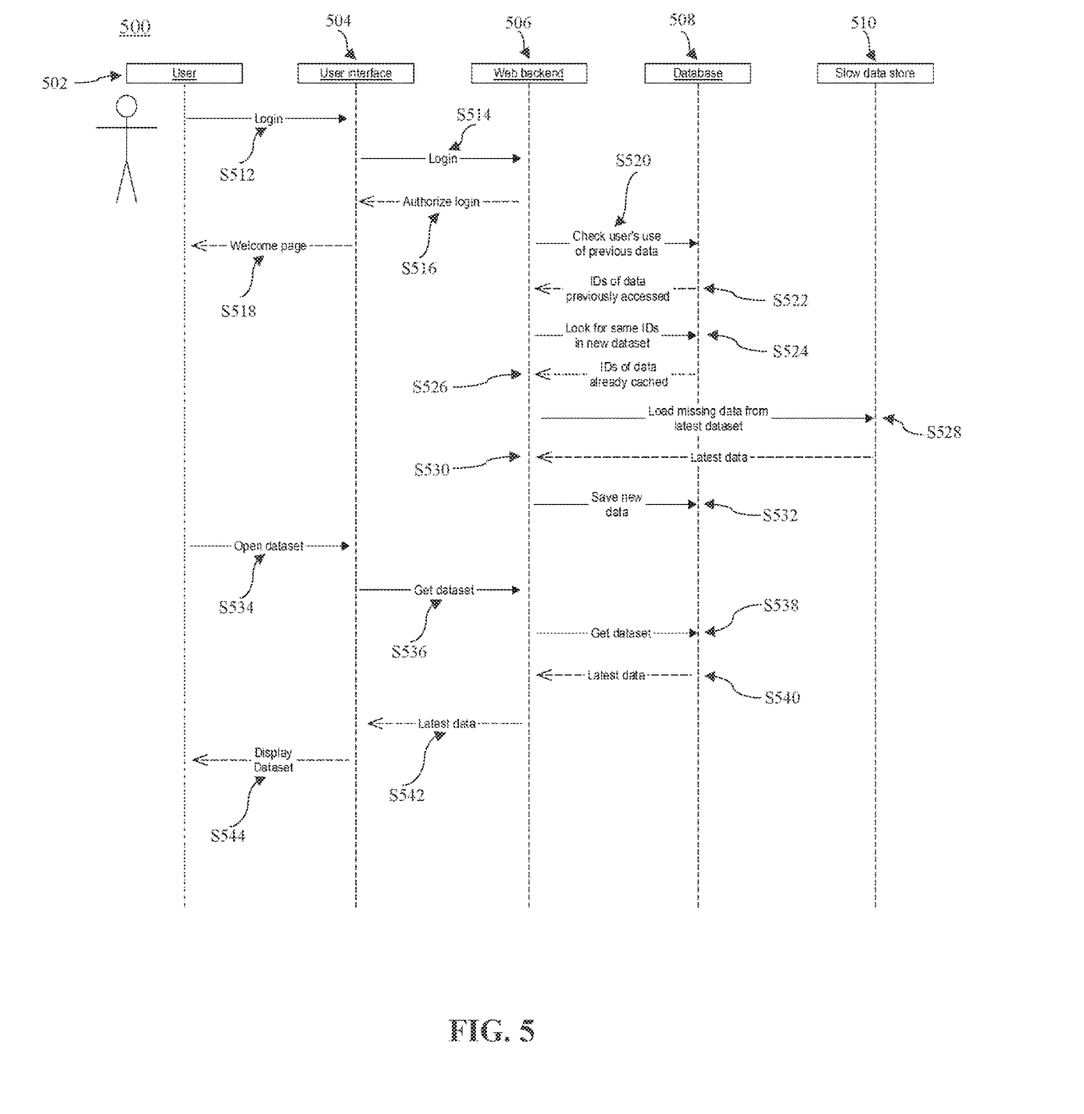
FIG. 5 is a flowchart that illustrates an exemplary process for implementing a method for identifying a user's previously accessed data and placing a copy of the data in a temporary file store in anticipation of the user's future need.

FIG. 5 is a flowchart that illustrates an exemplary process 500 for implementing a method for identifying a user's previously accessed data and placing a copy of the data in a temporary file store in anticipation of the user's future need. The process illustrated in FIG. 5 includes user 502 titled "User" interacting with graphical user interface 504 titled "User interface" on a client device connected to web back end server 506 titled "Web backend" that communicates with temporary file store 508 titled "Database" and long-term network file store 510 titled "Slow data store."

Process 500 in FIG. 5 begins with user 502 initiating an interaction with graphical user interface 504 by logging in at step S512. To complete the login, graphical user interface 504 transmits login credentials to web back end server 506 at step S514. After authenticating the login credentials, web back end server 506 authorizes the login and sends the authorization to graphical user interface 504 at step S516. Once authorization is received, graphical user interface 504 presents a welcome page to user 502 at step S518.

As web back end server 506 completes the authentication of the of the login credentials, web back end server 506 automatically engages temporary file store 508 to identify data using data usage information at step S520. At step S522, data that have been previously accessed by user 502 are identified by web back end server 506 in temporary file store 508. Then, at step S524, web back end server 506 looks for the identified data in temporary file store 508. After finding the identified data, web back end server 506 then checks the identified data at step S526 for any new data that may not yet have been stored in temporary file store 508.

When new data that may not yet have been stored is detected, web back end server 506 may query long-term network file store 510 for the missing data at step S528. A copy of the identified data, including the new data, in long-term network file store 510 may be generated by web back end server 506 in step S530, associated with the identified data, and saved in temporary file store 508 in step S532.

At step S534, user 500 selects an input on graphical user interface 504 to access the identified data. Graphical user interface 504 then transmits the user request to back end server 506 at step S536. Then, at step S538, web back end server 506 matches the user request with the copy of the identified data in temporary file store 508. After matching the user request with the corresponding copy of the identified data using information relating to the association between the copy and the identified data, Web back end server 506 retrieves the copy from temporary file store 506 at step S540 and provides the copy to graphical user interface 504 at step S542. Finally, graphical user interface 504 displays the copy for user 502 at step S544.

Accordingly, with this technology, an optimized process for identifying a user's previously accessed data and placing a copy of the data in a temporary file store in anticipation of the user's future need is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing targeted pre-caching of data, the method being implemented by at least one processor, the method comprising:
    receiving, by the at least one processor via a graphical user interface, a user login that includes at least one account identifier;
    automatically identifying, by the at least one processor in a network file store, at least a subset of the data previously accessed by a user using at least one activity log and the at least one account identifier;
    generating, by the at least one processor, at least one copy of the at least a subset of the data;
    associating, by the at least one processor, the at least one copy with the at least a subset of the data by linking the at least a subset of the data with the at least one copy; and
    storing, by the at least one processor, the at least one copy in at least one temporary file store.

2. The method of claim 1, further comprising:
    receiving, by the at least one processor via the graphical user interface, a request from the user for the at least a subset of the data; and
    displaying, by the at least one processor via a display, the at least one copy on the graphical user interface.

3. The method of claim 1, further comprising:
    receiving, by the at least one processor via a graphical user interface, a new user login;
    identifying, by the at least one processor in the network file store, at least a new subset of the data previously accessed by the user;
    identifying, by the at least one processor in the at least one temporary file store, the at least one copy corresponding to the user; and
    comparing, by the at least one processor, the at least a new subset of the data with the corresponding at least one copy.

4. The method of claim 3, further comprising:
    determining, by the at least one processor, whether the at least a new subset of the data includes new information that is not present in the at least one copy;
    updating, by the at least one processor based on a result of the determining, the at least one copy with the new information; and
    storing, by the at least one processor in the at least one temporary file store, the updated at least one copy.

5. The method of claim 1, wherein the at least one activity log includes at least one from among a record of previous data access by the user and a record of previous data access for a plurality of second users with at least one characteristic in common with the user.

6. The method of claim 5, wherein the at least one activity log further includes data access activity corresponding to a predetermined period of time.

7. The method of claim 1, wherein the graphical user interface includes at least one user selectable element for manual selection of at least a second subset of the data to store in the temporary file store.

8. The method of claim 7, wherein the at least a second subset of the data is automatically associated with a plurality of other users with at least one characteristic in common with the user.

9. The method of claim 1, wherein the at least one copy in the at least one temporary file store is automatically updated based on a predetermined time interval.

10. The method of claim 1, wherein the at least one temporary file store includes at least one hardware component and at least one software component that computes data relations in advance of a request for data to enable faster access to the data.

11. A computing device configured to implement an execution of a method for providing targeted pre-caching of data, the computing device comprising:
    a processor;
    a memory; and
    a communication interface coupled to each of the processor and the memory,
    wherein the processor is configured to
        receive, via a graphical user interface, a user login that includes at least one account identifier;
        automatically identify, in a network file store, at least a subset of the data previously accessed by a user using at least one activity log and the at least one account identifier;
        generate at least one copy of the at least a subset of the data;
        associate the at least one copy with the at least a subset of the data by linking the at least a subset of the data with the at least one copy; and
        store the at least one copy in at least one temporary file store.

12. The computing device of claim 11, wherein the processor is further configured to:
    receive, via the graphical user interface, a request from the user for the at least a subset of the data; and
    display, via a display, the at least one copy on the graphical user interface.

13. The computing device of claim 11, wherein the processor is further configured to:
    receive, via a graphical user interface, a new user login;
    identify, in the network file store, at least a new subset of the data previously accessed by the user;
    identify, in the at least one temporary file store, the at least one copy corresponding to the user; and
    compare the at least a new subset of the data with the corresponding at least one copy.

14. The computing device of claim 13, wherein the processor is further configured to:
    determine whether the at least a new subset of the data includes new information that is not present in the at least one copy;
    update, based on a result of the determining, the at least one copy with the new information; and
    store, in the at least one temporary file store, the updated at least one copy.

15. The computing device of claim 11, wherein the at least one activity log includes at least one from among a record of previous data access by the user and a record of previous data access for a plurality of second users with at least one characteristic in common with the user.

16. The computing device of claim 15, wherein the at least one activity log further includes data access activity corresponding to a predetermined period of time.

17. The computing device of claim 11, wherein the graphical user interface includes at least one user selectable element for manual selection of at least a second subset of the data to store in the temporary file store.

18. The computing device of claim 17, wherein the processor is further configured to automatically associate the at least a second subset of the data with a plurality of other users with at least one characteristic in common with the user.

19. The computing device of claim 11, wherein the processor is further configured to automatically update the at least one copy in the at least one temporary file store based on a predetermined time interval.

20. The computing device of claim 11, wherein the at least one temporary file store includes at least one hardware component and at least one software component that computes data relations in advance of a request for data to enable faster access to the data.

* * * * *